(12) United States Patent
Moriuchi et al.

(10) Patent No.: US 9,419,253 B2
(45) Date of Patent: Aug. 16, 2016

(54) BATTERY PACK AND ITS FABRICATING METHOD, BATTERY, AND ELECTRONIC DEVICE

(75) Inventors: Ken Moriuchi, Jiangsu (CN); Mamoru Baba, Fukushima (JP)

(73) Assignees: SONY ELECTRONICS (WUXI) CO., LTD., Jiangsu Province (CN); SONY CORPORATION, Tokyo (JP)

( * ) Notice: Subject to any disclaimer, the term of this patent is extended or adjusted under 35 U.S.C. 154(b) by 459 days.

(21) Appl. No.: 13/587,628

(22) Filed: Aug. 16, 2012

(65) Prior Publication Data
US 2013/0052512 A1    Feb. 28, 2013

(30) Foreign Application Priority Data

Aug. 29, 2011 (CN) .......................... 2011 1 0249628

(51) Int. Cl.
  H01M 2/02     (2006.01)
  H01M 2/30     (2006.01)
  H01M 4/505    (2010.01)
  H01M 4/525    (2010.01)
  H01M 4/587    (2010.01)
  H01M 10/0525  (2010.01)

(52) U.S. Cl.
  CPC ............ *H01M 2/0207* (2013.01); *H01M 2/026* (2013.01); *H01M 2/027* (2013.01); *H01M 2/0267* (2013.01); *H01M 2/0287* (2013.01); *H01M 2/30* (2013.01); *H01M 4/505* (2013.01); *H01M 4/525* (2013.01); *H01M 4/587* (2013.01); *H01M 10/0525* (2013.01); *Y10T 29/49108* (2015.01)

(58) Field of Classification Search
  CPC .......................... H01M 2/0267; H01M 2/0287
  USPC .............................................. 429/122–347, 7
  See application file for complete search history.

(56) References Cited

U.S. PATENT DOCUMENTS

2007/0196733 A1* 8/2007 Lee ................................ 429/185
2010/0040947 A1* 2/2010 Sennami et al. ............... 429/178

FOREIGN PATENT DOCUMENTS

CN          1823435         8/2006
CN          101651235       2/2010

OTHER PUBLICATIONS

Office Action issued in connection with Chinese Patent Application No. 201110249628.1, dated May 4, 2014. (19 pages).

* cited by examiner

*Primary Examiner* — Jonathan G Leong
(74) *Attorney, Agent, or Firm* — Chip Law Group

(57) ABSTRACT

The present invention provides a battery pack and its fabricating method, a battery and an electronic device. The battery pack provided by the present invention comprises: an outer package, which is in a laminated form and has a conductive layer therein; and a battery cell, which has a positive electrode terminal and a negative electrode terminal and is housed in the outer package, wherein, the positive electrode terminal or the negative electrode terminal of the battery cell is electrically connected to said conductive layer at the part led out from the outer package. With the battery pack and its fabricating method provided by the present invention, the influence of electrostatic discharge can be eliminated with a more simple structure.

3 Claims, 13 Drawing Sheets

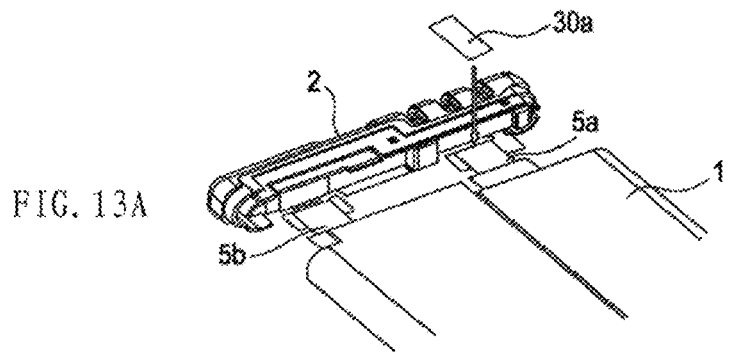
FIG. 13A
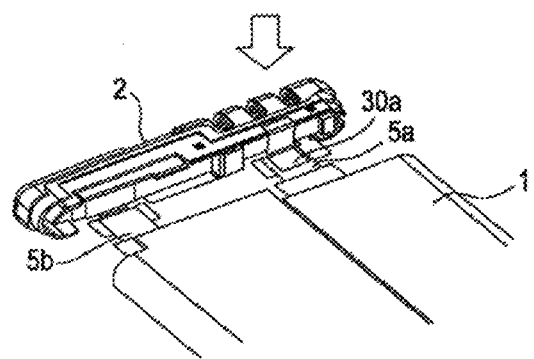
FIG. 13B
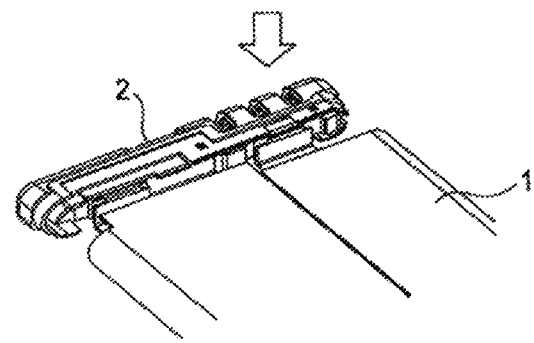
FIG. 13C
FIG. 13D

BATTERY PACK AND ITS FABRICATING METHOD, BATTERY, AND ELECTRONIC DEVICE

CROSS REFERENCES TO RELATED APPLICATIONS

The present application claims priority to Chinese Priority Patent Application CN201110249628.1 filed in the State Intellectual Property Office of the People's Republic of China on Aug. 29, 2011, the entire content of which is hereby incorporated by reference.

BACKGROUND

The present invention is related to a battery pack used in a battery of an electronic device, particularly to a battery pack and its fabricating method which can eliminate influence of electrostatic discharge, as well as a battery assembled with the same battery pack and an electronic device equipped with the same battery.

In recent years, battery packs have been used as power sources for mobile electronic devices. In such battery packs, an outer package houses a battery cell, and a protection circuit board on which a protection circuit and the like are mounted. As an outer package used for such a battery pack, a box-shaped package comprising upper and lower cases and the like is widely used.

However, in the battery pack described above, when electrostatic discharge (ESD) occurs, static electricity may flow in the circuit board inside the battery pack, resulting in a malfunction of electronic circuits or damage to semiconductor elements. Furthermore, when the battery pack described above is contained and used in an electronic device, such as a mobile phone, functional failure may be caused in the body of the electronic device due to the occurrence of ESD. Especially in the case where the body of the electronic device has a structure having low tolerance to electrostatic discharge, there is a high probability of occurring functional failure.

FIG. 12 is a schematic view showing a battery pack housing part of an electronic device, such as a mobile phone. As shown in FIG. 11, usually the battery pack housing part 101 is provided with an opening 102, and a circuit board of the electronic device is exposed through the opening 102. In the electronic device having such a structure, when ESD occurs, there is a possibility that a conductive layer disposed on the surface of the outer package may form a static electricity path, and static electricity may flow in the circuit board exposed through the opening 102, resulting in a malfunction of electronic circuits or damage to semiconductor elements.

In order to solve the above problems, for example, a solution is disclosed in a Chinese patent application with publication number CN101651235A. FIGS. 13A to 13D are schematic views showing a method of assembling a battery pack in prior art. As shown in FIG. 13A, a conductive tape 30a is introduced into a battery pack, and one end of the conductive tape 30a is connected to a positive electrode lead 5a which is led out from a battery cell 4. Then, as shown in FIG. 13B, the other end of the conductive tape 30a is placed on an upper surface of a top cover 2. Next, as shown in FIG. 13C, while appropriately folding the positive electrode lead 5a and the negative electrode lead 5b, the top cover 2 is fitted into a top opening of the outer package 1. Thereby, as shown in FIG. 13D, the top opening of the outer package 1 is closed by the top cover 2, and the other end of the conductive tape 30a is clamped between a hard lamination of the outer package 1 and the top cover 2. Heater blocks composed of a metal, such as copper, are pressed against the upper and lower sides at the vicinity of the top of the outer package 1, and the periphery of the top cover 2 and a polypropylene layer within the hard lamination are heat-welded. Thereby, the polypropylene layer is melted, and the other end of the conductive tape 30a, which is clamped between the upper surface of the top cover 2 and the outer package 1, is electrically connected to a hard aluminum metal layer within the hard lamination. Similarly, heater blocks may be pressed against the upper and lower sides at the vicinity of the bottom of the outer package 1, and the periphery of the bottom cover 3 and the polypropylene layer within the hard laminate may be heat-welded. Consequently, by connecting a conductive layer of the lamination to a positive electrode terminal or a negative electrode terminal of the battery pack, the tolerance to ESD is improved.

However, the technologies in the above-mentioned documents have problems as below. First of all, by the way of using a conductive tape for connecting, it only can be conducted after a battery pack is accomplished and put into an assembling stage, which adds additional procedures and is difficult to guarantee reliability of the battery pack. Moreover, due to complex processes, the requirements for the assemble staff are extra increased, thereby production efficiency is reduced.

SUMMARY

The present invention is accomplished in view of the above problems, and the purpose of the present invention is to provide a battery pack and its fabricating method which eliminate influence of electrostatic discharge with a more simple structure, as well as a battery and an electronic device.

To achieve the purpose of the invention, the first aspect of the present invention provides a battery pack, which comprises: an outer package, which is in a laminated form and has a conductive layer therein; and a battery cell, which has a positive electrode terminal and a negative electrode terminal and is housed in the outer package, wherein, the positive electrode terminal or the negative electrode terminal of the battery cell is electrically connected to said conductive layer at the part led out from the outer package.

The second aspect of the present invention provides a method of fabricating a battery pack, which comprises the following procedures: Procedure 1, preparing a battery cell which has a positive electrode terminal and a negative electrode terminal; Procedure 2, preparing an outer package which is in a laminated form and has a conductive layer therein; Procedure 3, covering the battery cell with the outer package; Procedure 4, closing the battery cell within the outer package, and having the positive electrode terminal and the negative electrode terminal thereof led out from the closing part, respectively; and Procedure 5, electrically connecting the positive electrode terminal or the negative electrode terminal to said conductive layer at the part led out from the outer package.

The third aspect of the present invention provides a battery, which comprises a front cover unit, a battery pack and a back cover unit, wherein the battery pack comprises: an outer package, which is in a laminated form and has a conductive layer therein; and a battery cell housed in the outer package, wherein a positive electrode terminal or a negative electrode terminal of the battery cell is electrically connected to said conductive layer at the part led out from the outer package.

The fourth aspect of the present invention provides an electronic device, which comprises an electronic device body and a battery supplying power to the electronic device body, wherein the battery comprises a front cover unit, a battery pack and a back cover unit, and wherein the battery pack comprises: an outer package, which is in a laminated form and has a conductive layer therein; and a battery cell housed in the outer package, wherein a positive electrode terminal or a negative electrode terminal of the battery cell is electrically connected to said conductive layer at the part led out from the outer package.

With the battery pack and its fabricating method provided by the present invention, the influence of electrostatic discharge can be eliminated with a more simple structure.

Additional features and advantages are described herein, and will be apparent from the following Detailed Description and the figures.

BRIEF DESCRIPTION OF THE FIGURES

FIGS. 13A to 13D are schematic views showing a method of assembling a battery pack in prior art.

DETAILED DESCRIPTION

Figure 1:
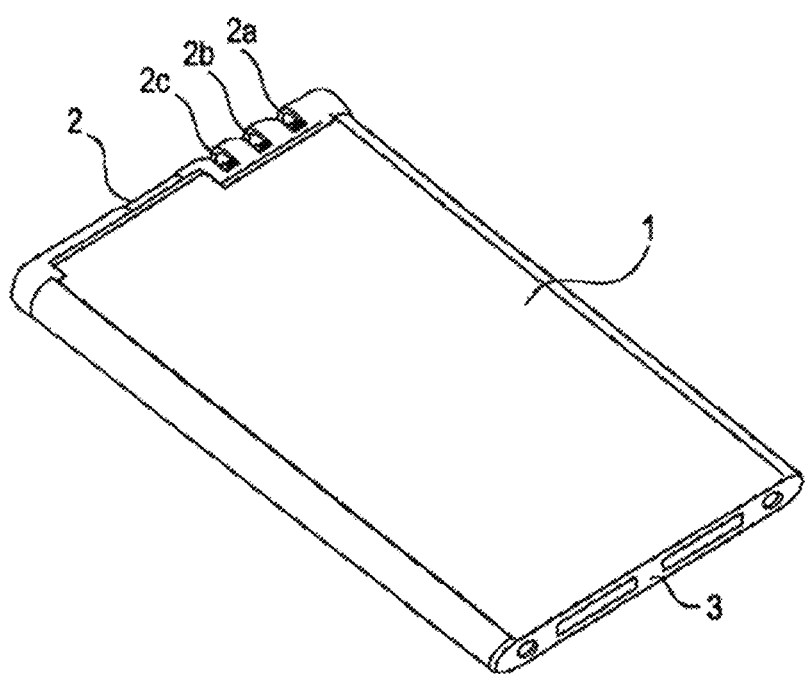
FIG. 1 is a perspective view showing an appearance of a battery pack according to an embodiment of the present invention.

Hereinbelow, embodiments of the present invention will be described with reference to the drawings. In all the drawings related to the embodiments, the same or corresponding parts are designated with the same reference numerals.

Figure 2:
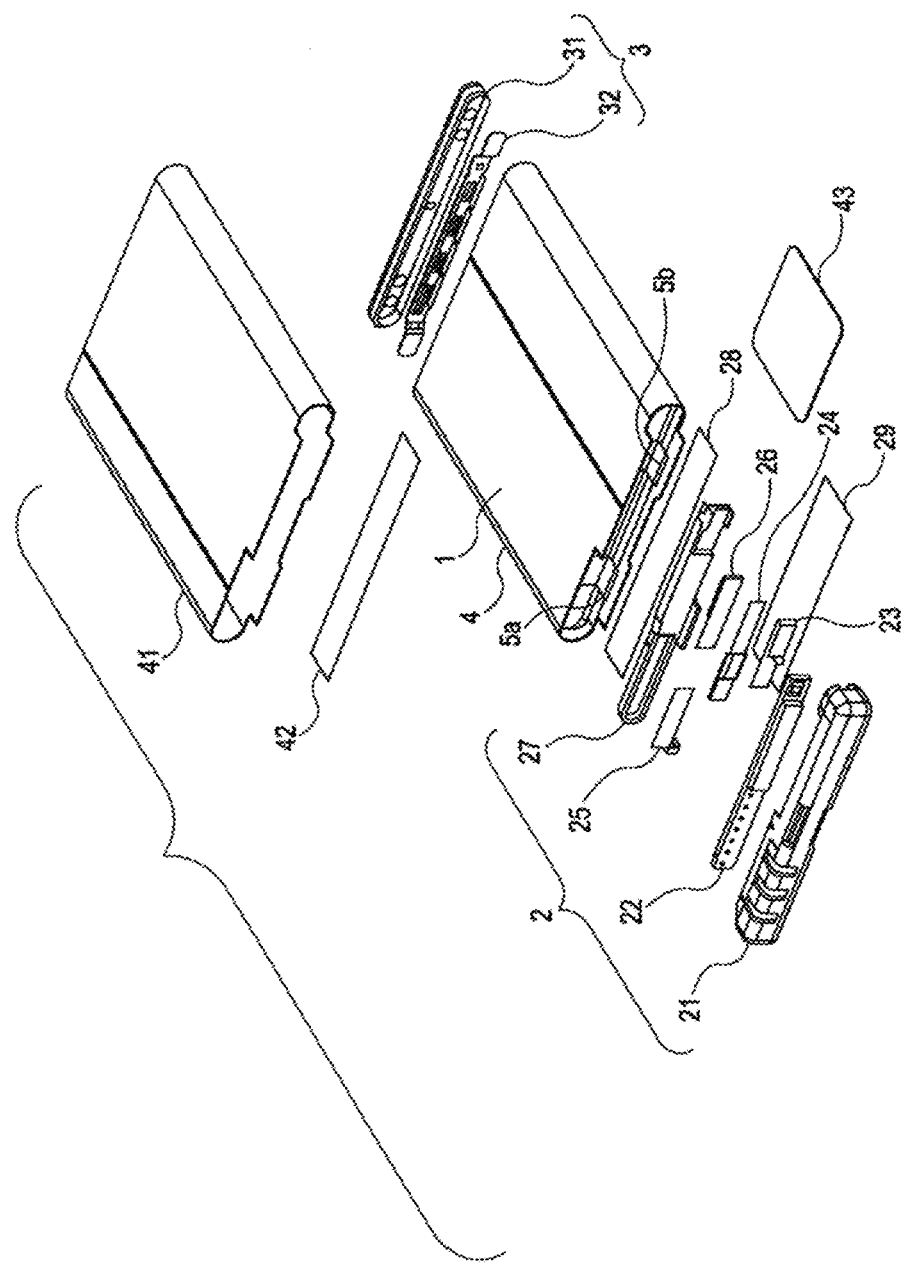
FIG. 2 is an exploded view showing one exemplary structure of a battery pack according to an embodiment of the present invention.

FIG. 1 is a perspective view showing an appearance of a battery pack according to an embodiment of the present invention. FIG. 2 is an exploded perspective view showing one exemplary structure of a battery pack according to an embodiment of the present invention. The battery pack is, for example, a rectangular or flat-type battery pack of a lithium ion polymer secondary battery. As shown in FIG. 1, in the battery pack, an outer package 1 houses a battery cell, and a top cover 2 and a bottom cover 3 are fitted into openings at both ends. The top cover 2 is provided with a positive electrode terminal 2a, a negative electrode terminal 2b, and an identification terminal 2c. A surface of the outer package 1 is covered with a label which is used as a surface member.

Below, the battery cell 4, the outer package 1, the top cover 2, and the bottom cover 3 will be described.

<Battery Cell>

Figure 3:
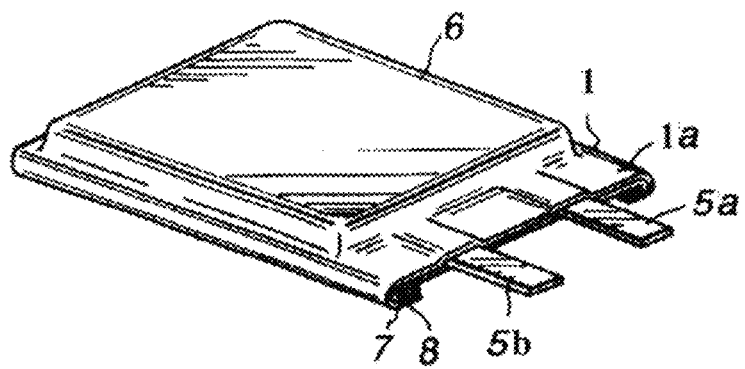
FIG. 3 is a perspective view showing one exemplary appearance of a battery cell according to an embodiment of the present invention.

FIG. 3 is a perspective view showing one exemplary appearance of the battery cell 4 according to an embodiment of the present invention. As shown in FIG. 3, the battery cell 4, for example, has a rectangular or flat shape. A strip-like positive electrode and a strip-like negative electrode are laminated with a polymer electrolyte and a separator interposed therebetween, and wound in a longitudinal direction. A positive electrode lead 5a and a negative electrode lead 5b are respectively led out from the positive electrode and the negative electrode.

The positive electrode comprises a strip-like positive electrode current collector, a positive electrode active material layer disposed on the positive electrode current collector, and a polymer electrolyte layer disposed on the positive electrode active material layer. The negative electrode comprises a strip-like negative electrode current collector, a negative electrode active material layer disposed on the negative electrode current collector, and a polymer electrolyte layer disposed on the negative electrode active material layer. The positive electrode lead 5a of the positive electrode and the negative electrode lead 5b of the negative electrode are respectively connected to the positive electrode current collector and the negative electrode current collector. As the positive electrode active material, the negative electrode active material, and the polymer electrolyte, commonly known materials may be used.

In the positive electrode, metal oxide, metal sulfide, or particular polymer may be used as a positive electrode active material, depending on the type of the desired battery. For example, when a lithium ion battery is fabricated, a lithium compound oxide containing, as a main component, $LiXMO_2$ (wherein M represents at least one transition metal, and X varies depending on the charge/discharge state of the battery and is usually in a range of 0.05 to 1.10) may be used as the positive electrode active material. As the transition metal M constituting the lithium compound oxide, cobalt (Co), nickel (Ni), manganese (Mn), or the like is preferred.

Specific examples of the lithium compound oxide include $LiCoO_2$, $LiNiO_2$, $LiNi_yCo_{1-y}O_2$ (wherein $0 \leq y > 1$), and $LiMn_2O_4$. These lithium compound oxides can generate high voltage and provide excellent energy density. Furthermore, as the positive electrode active material, a metal sulfide or oxide which does not contain lithium, such as $TiS_2$, $MoS_2$, $NbSe_2$, or $V_2O_5$, may be used. In the positive electrode, a plurality of types of positive electrode active materials may be combined for use. In the process of forming a positive electrode using the positive electrode active material described above, a conductive agent, a binder, etc. may also be added.

As a negative electrode active material, a material capable of being doped with and dedoped from lithium may be used. For example, a carbon material, such as a carbon material that can hardly be graphitized or a graphite material, may be used. Specific examples of the carbon material that can be used include pyrolytic carbons, cokes (pitch coke, needle coke, petroleum coke, etc.), graphites, vitreous carbon, sintered organic polymer compounds (carbonized compounds obtained by baking a phenolic resin, a furan resin, or the like at an appropriate temperature), carbon fibers, and activated carbon. Furthermore, as the material capable of being doped with and dedoped from lithium, a polymer, such as polyacetylene or polypyrrole, or an oxide, such as $SnO_2$, may be used.

In the process of forming a negative electrode using the material described above, a binder, etc. may also be added.

The polymer electrolyte is, for example, obtained by incorporating a gelled electrolyte into a polymer, the gelled electrolyte being formed by mixing a polymer material, an electrolyte solution, and an electrolyte salt. The polymer material dissolves in the electrolyte solution. Examples of the polymer material that can be used include silicon gel, acryl gel, acrylonitrile gel, modified polyphosphazene polymer, polyethylene oxide, polypropylene oxide, and composite polymers, crosslinked polymers, and modified polymers of these compounds. Fluorine-based polymers may also be used, and examples thereof include poly(vinylidene fluoride), poly(vinylidene fluoride-co-hexafluoropropylene), poly(vinylidene fluoride-co-trifluoroethylene), and mixtures of these compounds.

The electrolyte solution component is capable of dispersing the above-described polymer material. As an aprotic solvent, for example, ethylene carbonate (EC), propylene carbonate (PC), butylene carbonate (BC), or the like is used. As the electrolyte salt, an electrolyte salt that dissolves in the solvent is used, and it includes a combination of a cation and an anion. As the cation, an alkali metal or an alkaline earth metal is used. As the anion, Cl—, Br—, I—, SCN—, ClO4-, BF4-, PF6-, CF3SO3- or the like is used. As the electrolyte salt, specifically, lithium hexafluorophosphate or lithium tetrafluoroborate is used with a soluble concentration in the electrolyte solution.

<Outer Package>

Figure 4:
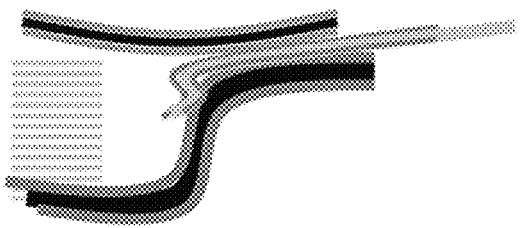
FIG. 4 is a sectional view showing an outer package which covers a battery cell.

FIG. 4 is a sectional view showing the outer package 1 which covers the battery cell 4. As shown in FIG. 4, the outer package 1 covers at the outer side of the battery cell 4, with positive and negative electrode leads led out, and constitutes a battery pack together with the battery cell 4.

Figure 5:
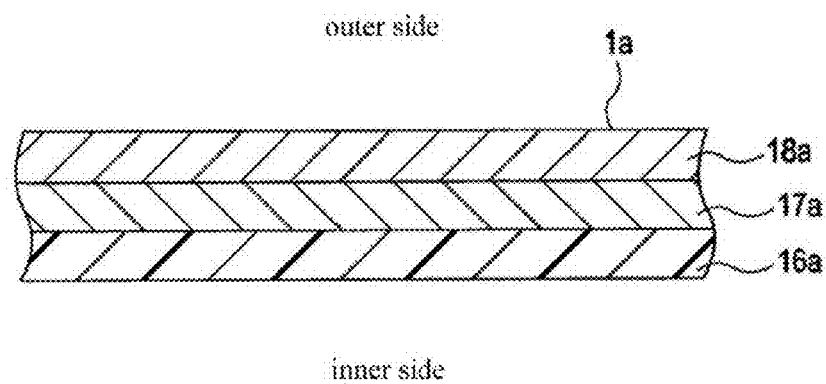
FIG. 5 is a sectional view showing one example of a laminated structure which constitutes an outer package.

FIG. 5 is a sectional view showing one example of a laminated structure which constitutes the outer package 1.

The outer package 1 has a laminated structure, as an example, in which a polypropylene (PP) layer 16a serving as an adhesion layer, a metal layer 17a serving as a conductive layer, and a nylon layer or polyethylene terephthalate (PET) layer 18a serving as a surface protection layer are laminated in that order. The polypropylene layer 16a side corresponds to an inner side (to be in contact with the hard laminate 1b). Certainly, the figure shows a three-layer laminated structure, but the skilled in the art should realize that, the number of laminated layers can be changed for a variety of purposes but not limited to the three layers exemplified in this application, and the materials used are not limited to the materials enumerated in this application but can be any appropriate material as long as it can achieve the invention purpose.

The polypropylene layer 16a has a function of preventing the degradation of the quality of the polymer electrolyte. As the polypropylene layer 16a, for example, cast polypropylene (CPP) or the like can be used. The thickness of the polypropylene (PP) layer 16a is, for example, about 30 μm.

The metal layer 17a has a function of preventing moisture from entering the inside of the outer package 1. As a material for the metal layer 17a, for example, annealed aluminum may be used. The thickness of the metal layer 17a is, for example, in a range of 30 to 130 μm.

The nylon layer or PET layer 18a has a function of surface protection. The thickness of the nylon layer or PET layer 18a is, for example, in a range of about 10 to 30 μm.

<Top Cover>

Returning to FIG. 2, it shows an exemplary structure of the top cover 2. The top cover 2 is fitted into the top opening of the outer package 1 to close the top opening. The top cover 2 comprises a top cover body 21, a circuit board 22, a relay tab 23, a fuse 24, a positive electrode tab 25, a negative electrode tab 26, and a holder 27. The top cover 2 has a housing part on the surface thereof facing the battery cell 4. The housing part houses the circuit board 22, the relay tab 23, the fuse 24, the positive electrode tab 25, and the negative electrode tab 26. These components are held in the top cover body 21 when the holder 27 is fitted into the top cover body 21. Furthermore, an insulating tape 28 and an insulating tape 29 may be disposed between the top cover 2 and the outer package 1.

The positive electrode lead 5a led out from the battery cell 4 is connected through the positive electrode tab 25 to the circuit board 22. The negative electrode lead 5b led out from the battery cell 4 is connected through the negative electrode tab 26, the fuse 24, and the relay tab 23 to the circuit board 22.

A protection circuit and an ID resistor for identifying the battery pack are mounted on the circuit board 22. The protection circuit contains a temperature protection element, such as a fuse 24, a positive temperature coefficient (PTC) element or a thermistor. The protection circuit is provided with an integrated circuit (IC) for monitoring the secondary battery and controlling field effect transistors (FETs), and charge/discharge control FETs.

The PTC element is connected in series to the battery cell 4. The electric resistance of the PTC element sharply increases when the temperature of the battery cell 4 becomes higher than the preset temperature, and thereby, current flowing into the battery cell 4 is substantially interrupted. The fuse 24 or the thermistor is also connected in series to the battery cell 4. When the temperature of the battery cell 4 becomes higher than the preset temperature, current flowing into the battery cell 4 is interrupted. The protection circuit, which includes the IC for monitoring the battery cell 4 and controlling the FETs as well as charge/discharge control FETs, monitors the voltage of the battery cell 4, since there is a possibility that a dangerous state, such as heat generation and ignition, may occur if the terminal voltage of the battery cell 4 exceeds, for example, 4.3 to 4.4 V. The protection circuit turns off the charge control FET when the voltage exceeds, for example, 4.3 to 4.4 V, thus inhibiting charging. If the terminal voltage of the battery cell 4 is decreased to the discharge prohibition voltage or less due to over-discharging and the secondary battery voltage becomes 0 V, then an internal short-circuit state of the battery cell 4 may be caused, resulting in incapability of recharging. Therefore, the protection circuit monitors the secondary battery voltage, and turns off the discharge control FET when the voltage becomes lower than the discharge prohibition voltage, thus inhibiting discharging.

<Bottom Cover>

FIG. 2 shows an exemplary structure of the bottom cover 3. The bottom cover 3 closes the opening on the bottom side of the outer package 1. The bottom cover 3 includes a bottom cover body 31 and a bottom plate 32. The bottom plate 32 is disposed between the bottom cover body 31 and the battery cell 4. The bottom cover body 31 is provided with one or two or more through-holes used for an injection of molten resin between the bottom cover 3 and the battery cell.

[Method of Fabricating Battery Pack]

Below, an example of a method of fabricating a battery pack according to an embodiment of the present invention will be described.

<Steps of Preparing Battery Cell and Outer Package>

First, steps of preparing a battery cell will be introduced. A positive electrode and a negative electrode, each having gel electrolyte layers on both surfaces thereof, as well as separators are prepared. The negative electrode, the separator, the positive electrode, and the separator are laminated in that order, and the resulting laminate is folded around a flat core plate and wound many times in the longitudinal direction. A winding-type battery cell 4 is thereby formed. In addition, as above introduced, an outer package usually adopts a laminated structure of three layers. Thus, a battery pack assembling can be performed after a battery cell and a outer package are well prepared.

<Steps of Outer Package Covering>

Figure 6:
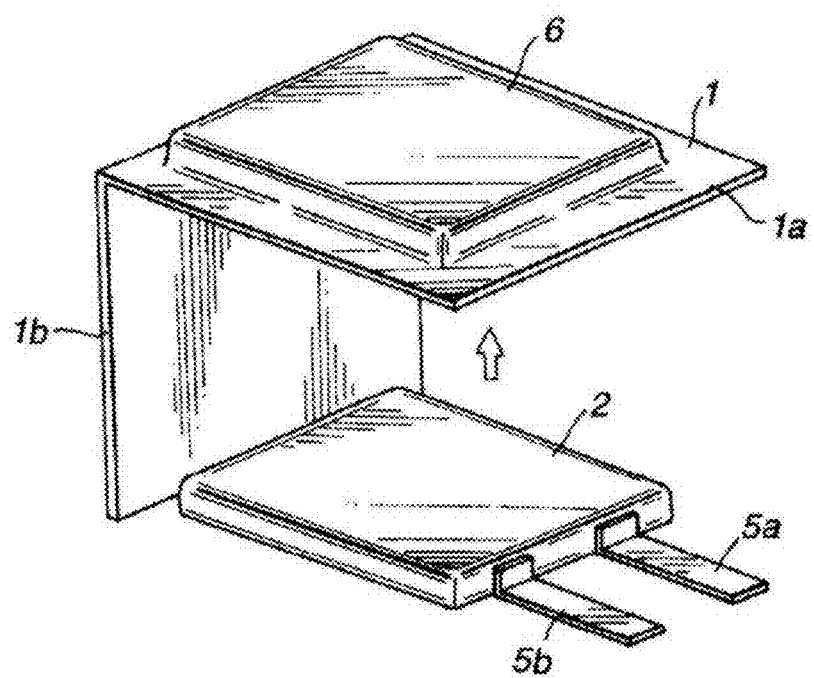
FIG. 6 is a schematic view showing a method of fabricating a battery pack according to an embodiment of the present invention.
Figure 10:
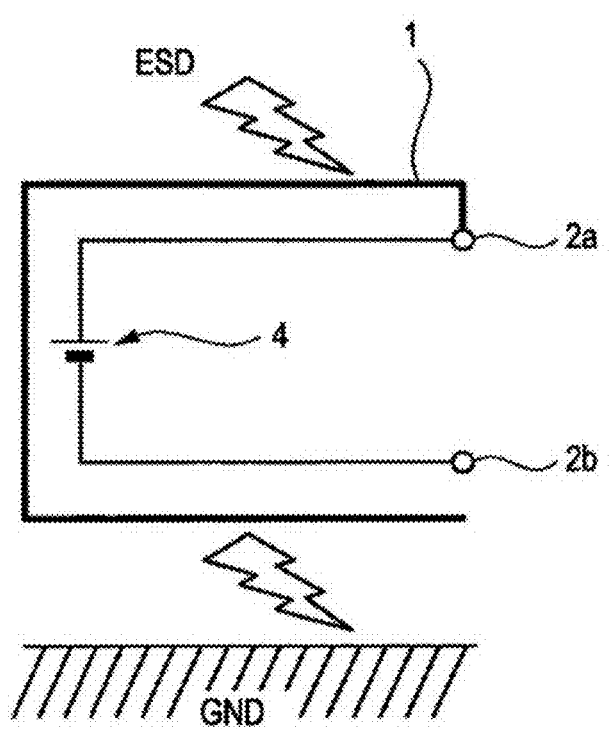
FIG. 10 is an equivalent circuit diagram showing a flow of static electricity when ESD occurs, while a conductive layer of an outer package is set to have a positive electric potential.

Next, with reference to FIG. 6, the steps of using the outer package 1 to cover the battery cell formed in the previously described steps will be explained. FIG. 6 is a schematic view explaining a method of fabricating a battery pack according to an embodiment of the present invention. As shown in FIG. 6, first, a sheet used as a substrate of the outer package 1 is divided into a container area 1*a* for forming a battery container and a covering area 1*b* for covering the battery container, with the battery container 6 being formed on the sheet by deep drawing so as to house the battery cell 4. Thus, an outer package is prepared. Then, the prepared battery cell 4 is placed into the battery container 6, with two electrode leads are left out of the opening side. Next, as shown in FIG. 6, by folding the covering area 1*b* toward the container area 1*a* to cover the battery container and the battery cell 4 therein, then connecting the edges by hot-melting, and bending the extra part in size toward the battery side, a battery pack is formed. In addition, in order to ensure the tightness at the location of the electrode leads, as the following FIG. 10 shows, a sealing layer will be wrapped on the electrode leads near the part to be closed with the outer packaging 1. Certainly, the sealing layer is not an indispensable structure for achieving the purpose of the present invention, which can be omitted as appropriate depending on purposes and costs. The above has explained the example in which two electrode leads are led out in the same direction, also the two electrode leads may be led out in different directions, respectively, but the method of closing and size adjusting have no essential differences, therefore the description is omitted.

<Step of Connecting Electrode with Metal Layer>

Figure 7:
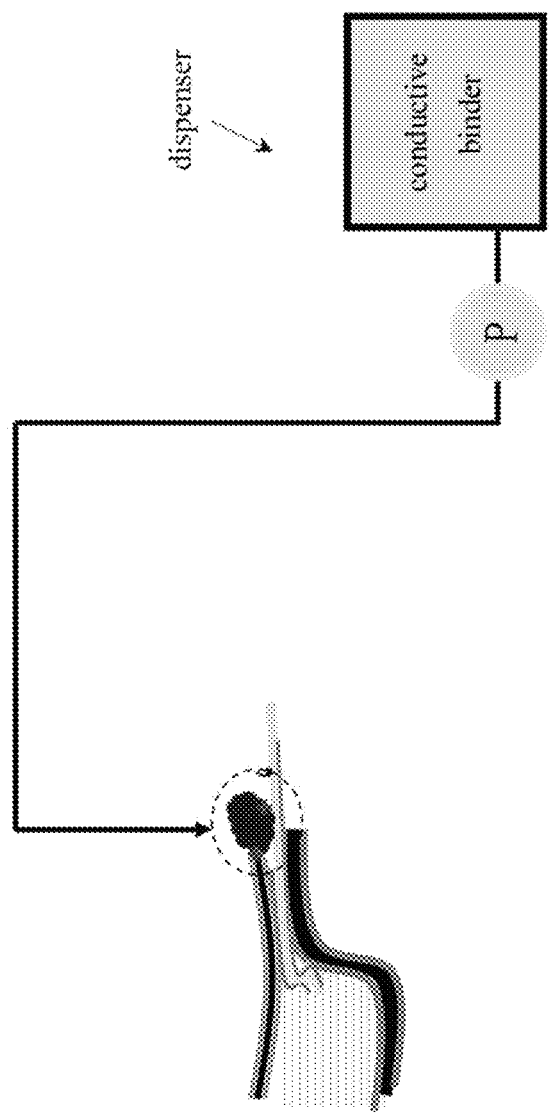
FIG. 7 is a schematic view showing one exemplary method of connecting an electrode with a metal layer.
Figure 8A:
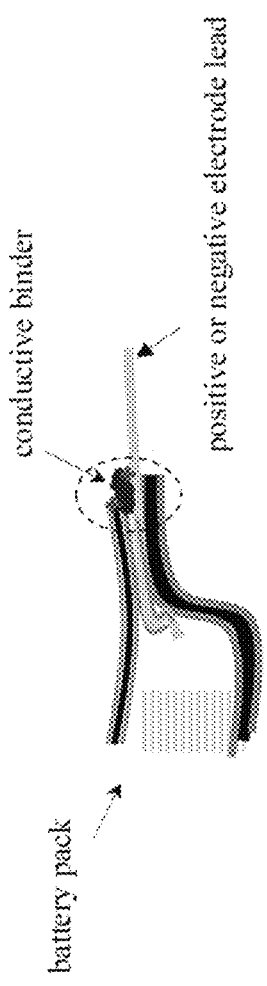
FIG. 8A is a schematic view showing a connecting state between an electrode and a metal layer.
Figure 8B:
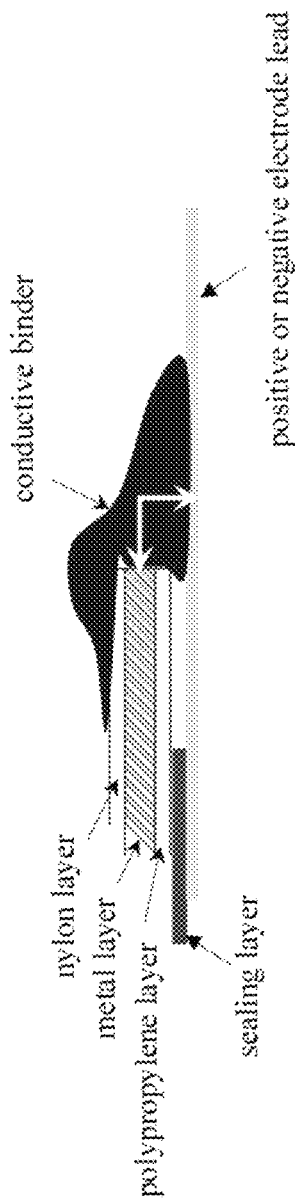
FIG. 8B is an enlarged view of a connecting part between an electrode and a metal layer shown in FIG. 8A.

FIG. 7 is a schematic view showing one exemplary method of connecting an electrode with a metal layer. FIG. 8A is a schematic view showing a connecting state between an electrode and a metal layer. FIG. 8B is an enlarged view of a connecting part between an electrode and a metal layer shown in FIG. 8A. As an example, as shown in the figures, at the sealing part where the electrode lead is led out of the outer package 1, by peeling off the sealing layer on the positive electrode lead 5*a* or on the negative electrode lead wire 5*b*, the metal part of the electrode lead is exposed. Then, using a dispenser loaded with conductive binder to quantitatively drop the conductive binder at the location where the sealing layer is removed as above, so that the electrode lead and the metal layer 17*a* of the outer package 1 are in a conductive connection, thus the steps of connecting a electrode and a metal layer are accomplished. The conductive binder, for example, may use ThreeBond3315E available from 3M Company. Here a dispenser is exemplified as a device for delivering conductive binder, but besides that device, any other devices that can quantitatively dropping the conductive binder may be used as a delivery device for the present invention. In addition, the above has described peeling off the sealing layer on the positive electrode lead 5*a* or on the negative electrode lead wire 5*b* and thus exposing the metal part of the electrode lead, but in actual processes, it is also possible that the sealing layer is only formed till an end face of the metal layer 17*a*, that is, the sealing layer is formed on the inner side of said end face, thereby a procedure of peeling off the sealing layer can be omitted.

In addition, besides using conductive binder, various methods such as resistance welding, connecting through an electric conductive adhesive tape and the like which are widely used in the art for electric conductive connecting an electrode with a metal layer, may be used. Among them, the resistance welding method, for example, may be implemented by using a general resistance welding machine produced by Miyachi Technology Company (ミヤチテクノス) and the connecting method by using an electric conductive adhesive tape for example may be implemented by adopting the conductive tape sold by 3M Company and cutting it into certain size then sticking it on the place supposed to be conducted.

Thus, the positive electrode lead 5*a* or the negative electrode lead 5*b* led out from the battery cell is electrically connected with the conductive layer of the outer package 1. Thereby, the conductive layer of the outer package 1 has the same electric potential as the positive electrode or the negative electrode of the battery cell. Preferably, in a connecting state, the resistance R between the positive electrode terminal 2*a* of the battery pack and the metal layer of the outer package 1 is equal to 1 MΩ, or less. Preferably, in a connecting state, the resistance R between the negative electrode terminal 2*b* of the battery pack and the metal layer of the outer package 1 is set at 500Ω, or less. In such a case, ESD tolerance can be further improved.

The above has introduced a battery pack and a battery assembled with the same, as well as their fabricating methods provided by the present invention. Likewise, an electronic device whose body is powered by the battery of the present invention also belongs to the protection scope of the present invention.

Below, the principle of the present invention for solving the problem of electrostatic discharge will be introduced briefly.

Figure 9:
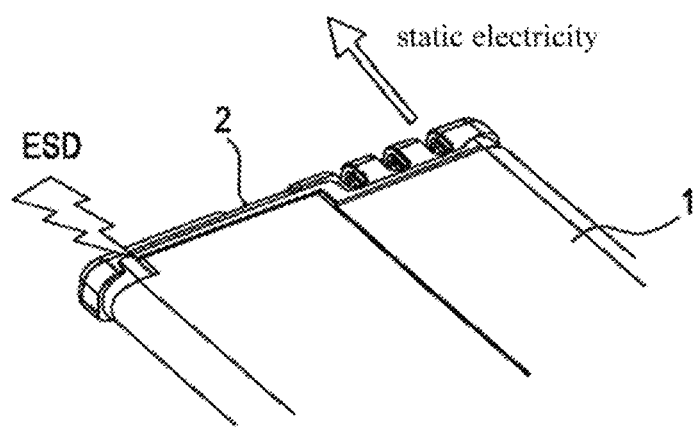
FIG. 9 is a schematic view showing a flow of static electricity when ESD occurs.

FIG. 9 is a schematic view showing a flow of static electricity when ESD occurs. FIG. 10 is an equivalent circuit diagram showing a flow of static electricity when ESD occurs, while the conductive layer of the outer package 1 is set to have a positive electric potential. A case where ESD occurs and static electricity enters the outer package 1 as shown in FIG. 8 will be described below.

When the conductive layer of the outer package 1 is set to have a positive electric potential, static electricity entering the outer package 1 flows in the charging direction of the battery cell 4. Therefore, static electricity assumes to be attenuated through the battery cell 4. Consequently, the influence on the casing containing the battery pack is decreased by an amount equivalent to the amount of static electricity charged to (absorbed by) the battery cell 4. Part of static electricity may flow into GND of the casing. In such a case, the part is separated from the remaining part of static electricity that enters the battery cell 4, and therefore, the influence on the casing containing the battery pack is decreased.

A substance is composed of atoms or molecules, and a molecule is composed of one or a plurality of atoms. An atom has a structure in which electrically negative electrons surround a nucleus (positive protons). Outer-shell electrons are in a state being easily detached. A substance which easily releases outer-shell electrons is a substance that is easily positively charged, and a substance which easily attracts electrons into the outer shell is a substance that is easily negatively charged. In terms of flow of electricity, there is no difference between being positively charged and being negatively charged. Therefore, the charge polarity with respect to ESD is not particularly described here.

In the case that the positive electrode lead 5*a* of the battery cell 4 and the conductive layer of the outer package 1 are electrically connected to each other, the outer package 1 can be set to have a positive electric potential. When the outer package 1 is set to have a positive electric potential instead of being neutral, static electricity flowing into the battery pack flows in the charging direction of the battery cell 4. Therefore, static electricity assumes to be attenuated through the battery cell 4. Consequently, it is possible to prevent static electricity from flowing into the circuit board of the electronic device disposed in the vicinity of the battery pack housing part in an amount equivalent to the amount of static electricity charged to (absorbed by) the battery cell 4.

Figure 11:
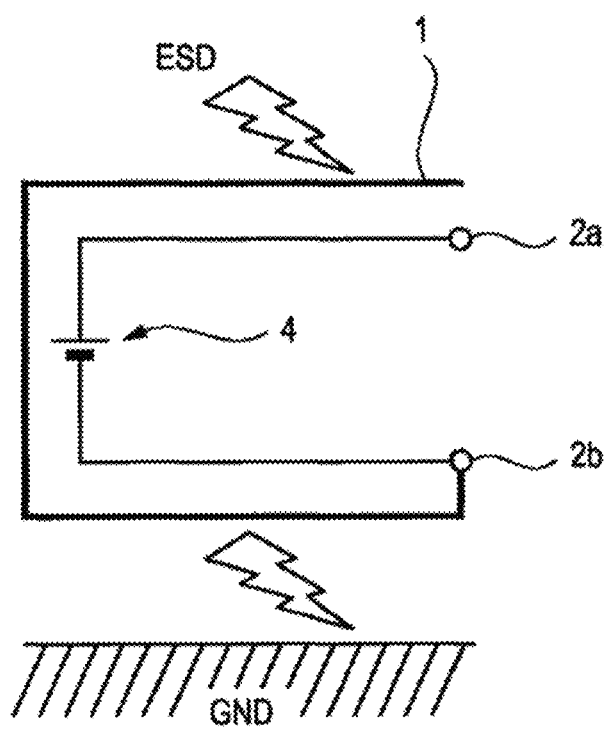
FIG. 11 is an equivalent circuit diagram showing a flow of static electricity when ESD occurs, while a conductive layer of an outer package is set to have a negative electric potential.
Figure 12:
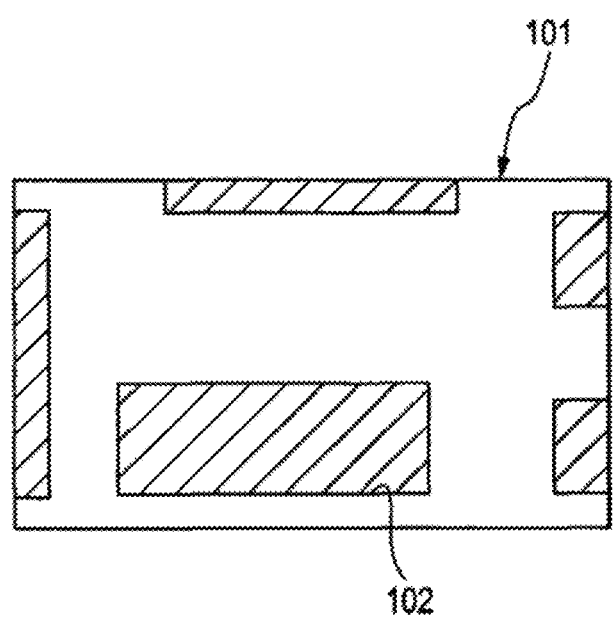
FIG. 12 is a schematic view showing a battery pack housing part of an electronic device, such as a mobile phone.

FIG. 11 is an equivalent circuit diagram showing a flow of static electricity when ESD occurs, while the conductive layer of the outer package 1 is set to have a negative electric potential. When the conductive layer of the outer package 1 is set to have a negative electric potential, static electricity entering the outer package 1 flows in the discharging direction of the battery cell 4. Therefore, static electricity is believed to be reflected without passing through the battery cell 4. Consequently, the influence on the casing containing the battery pack is large. However, in this method, if the electric potential on the casing side is set to be a negative potential without a gap (space) between the conductive layer of the outer package 1 and the casing of the body, then discharging occurs between the outer package 1 and ESD of the casing of the body, which is effective as the measure.

In the case that the negative electrode lead 5*b* and the conductive layer of the outer package 1 are electrically connected, the outer package 1 can be set to have a negative electric potential. When the outer package 1 is set to have a negative electric potential, static electricity due to ESD flows in the discharging direction of the battery cell 4. Therefore, static electricity assumes to flow into the negative electrode terminal of the electronic device without passing through the battery cell 4. Consequently, it is possible to prevent static electricity from flowing into the circuit board of the electronic device disposed in the vicinity of the battery pack housing part.

The above has introduced a battery pack and its fabricating method, and by using the battery pack and its fabricating method provided by the present invention, the influence of electrostatic discharge can be eliminated with a more simple structure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
    an outer package including an adhesive layer, a conductive layer and a protective layer from an inner side to an outer side, respectively; and
    a battery cell, which has a positive electrode terminal and a negative electrode terminal and is housed in the outer package,
    wherein the positive electrode terminal or the negative electrode terminal of the battery cell is electrically connected to said conductive layer at the part led out from the outer package by a conductive binder,
    wherein the conductive binder extends onto an outer side of the protective layer,
    wherein the positive electrode terminal or the negative electrode terminal of the battery cell is partially covered with a sealing layer on the inner side of the adhesive layer at the part led out from the outer package, and
    wherein the sealing layer and the conductive binder define a gap therebetween.

2. A battery comprising:
    a front cover unit;
    a battery pack; and
    a back cover unit,
    wherein the battery pack comprises an outer package including an adhesive layer, a conductive layer and a protective layer from an inner side to an outer side, respectively, and a battery cell housed in the outer package,
    wherein a positive electrode terminal or a negative electrode terminal of the battery cell is electrically connected to said conductive layer at the part led out from the outer package by a conductive binder,
    wherein the conductive binder extends onto an outer side of the protective layer,
    wherein the positive electrode terminal or the negative electrode terminal of the battery cell is partially covered with a sealing layer on the inner side of the adhesive layer at the part led out from the outer package, and
    wherein the sealing layer and the conductive binder define a gap therebetween.

3. An electronic device comprising:
    an electronic device body; and
    a battery supplying power to the electronic device body,
    wherein the battery comprises a front cover unit, a battery pack and a back cover unit, and
    wherein the battery pack comprises an outer package including an adhesive layer, a conductive layer and a protective layer from an inner side to an outer side, respectively, and a battery cell housed in the outer package,
    wherein a positive electrode terminal or a negative electrode terminal of the battery cell is electrically connected to said conductive layer at the part led out from the outer package by a conductive binder,
    wherein the conductive binder extends onto an outer side of the protective layer,
    wherein the positive electrode terminal or the negative electrode terminal of the battery cell is partially covered with a sealing layer on the inner side of the adhesive layer at the part led out from the outer package, and
    wherein the sealing layer and the conductive binder define a gap therebetween.

* * * * *